Feb. 5, 1946.  C. S. McCHESNEY  2,394,318
TIRE PLY TURNING MECHANISM
Original Filed Oct. 3, 1942   3 Sheets-Sheet 1

INVENTOR.
CUYLER S. McCHESNEY.
BY Benj. T. Rauber
his ATTORNEY.

Feb. 5, 1946.   C. S. McCHESNEY   2,394,318
TIRE PLY TURNING MECHANISM
Original Filed Oct. 3, 1942   3 Sheets-Sheet 3

INVENTOR
CUYLER S. McCHESNEY
BY Benj. T. Rauber
ATTORNEY

Patented Feb. 5, 1946

2,394,318

UNITED STATES PATENT OFFICE 2,394,318

TIRE PLY TURNING MECHANISM

Cuyler S. McChesney, Kenmore, N. Y., assignor to Dunlop Tire and Rubber Corporation, Buffalo, N. Y., a corporation of New York Original application October 3, 1942, Serial No. 460,705. Divided and this application November 18, 1944, Serial No. 564,162

14 Claims. (Cl. 154—10)

My present invention relates to a mechanism for turning plies of fabric about tire beads on a forming drum.

The present application is a division of my copending application Serial No. 460,705, filed October 3, 1942, for "Tire building machine."

In building a tire carcass on a cylindrical forming drum plies of rubberized cord fabric or bias cut fabric are applied on and wrapped about the drum and are of sufficient width to overlap the end faces of the drum. Usually two or more plies are thus wrapped on the drum before the beads are placed in position.

Before placing the beads on the tire carcass the projecting ends of the fabric are pressed against the end faces of the drum to form flat surfaces on which the beads are mounted by pressing them against these turned down surfaces to which they adhere, inasmuch as the rubberized fabric and the covering of the beads are both tacky or sticky.

The present invention relates to a mechanism whereby the part of the fabric within the area of the circular beads may be turned outwardly and about the beads so as to enclose them in the turned over plies of tire fabric.

In the present invention this is accomplished rapidly and uniformly while the forming drum is rotating. For this purpose the mechanism comprises a disk having a beveled edge which is pressed tightly against the end surface of the drum and thence moved outwardly until it contacts with the inner edge of the fabrics lying against the end wall of the drum. As the edge of the bevelled disk then enters or is forced between the end of the drum and the fabric, the fabric turns away from the end wall progressively as the disk approaches and reaches the bead. This disk is yieldingly held and its further movement is stopped by the bead.

To complete the turn over of the fabric a second disk or cylinder spaced from the end surface of the drum a distance equal to the width of the bead and of the turn over layers of fabric then passes outwardly pushing or folding the turned up fabric about the bead and in a reverse curve, or a turn of 180° or more, thus wrapping the fabric about the inner half of the bead. These turning actions on the fabric take place gradually and progressively, the disks moving outwardly while the drum is rotating and thus in a spiral outward path relative to the surface of the drum.

When the fold-over operation is completed the disks return to their original position and then are moved outwardly from the end face of the drum after which they may be lowered out of position. Two sets of disks are employed, one for each end face of the forming drum. The disks or cylinders may be mounted on suitable brackets which are brought into and out of position by pneumatic or equivalent actuating means and may also be brought to and away from the end faces of the drum by pneumatic or other resiliently acting means.

The various features of the invention are illustrated by way of example in the accompanying drawings in which Fig. 1 is a front elevation of mechanism embodying a preferred form of the invention;

Figure 1:
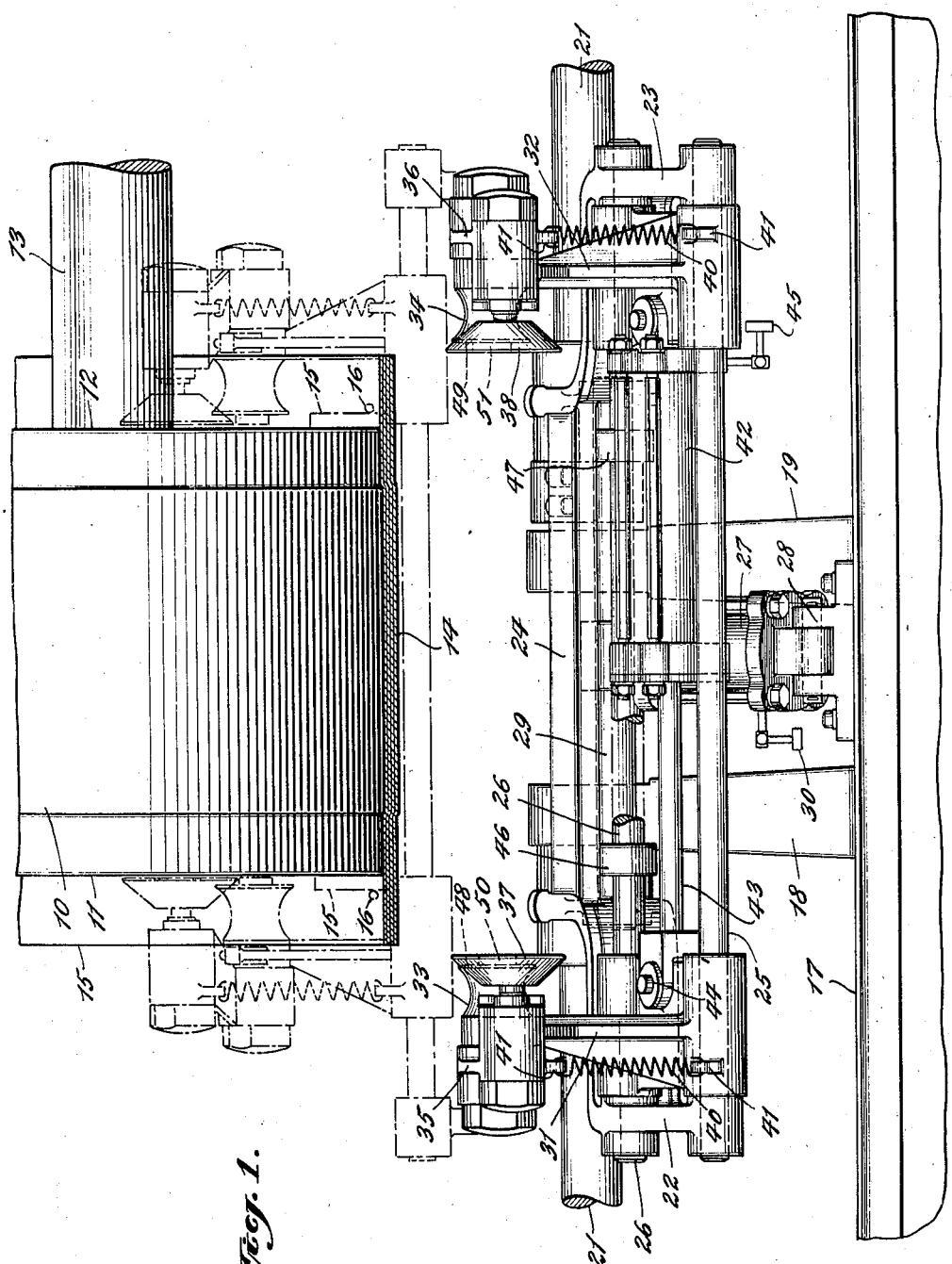

In the embodiment of the invention shown in the accompanying drawings it is illustrated as applied to a forming drum 10 having flat end faces 11 and 12 and mounted on a rotating shaft 13. Plies 14 of rubberized tire fabric are wrapped about the drum with the ends of the plies projecting as indicated at 15 in Fig. 1. These projecting ends are turned inwardly flat against the surface of the drum as indicated in broken lines in Fig. 1 and in full lines in Fig. 2, and a bead indicated at 16 is pressed against the inturned ply fabric to which it adheres owing to the tackiness of the bead surface and of the fabric. When the fabric is in this position on the drum the part of the fabric projecting inwardly beyond the bead is turned reversely and outwardly about the bead by the mechanism of the present invention.

The mechanism may be supported at a suitable distance below the drum 10 on a base 17 having a pair of standards 18 and 19 on which are supported a pair of rails or shafts 20 and 21 below and parallel to the surface of the drum 10.

On the shaft 21 a bracket is rotatably and slidably mounted and carries a pair of cone shaped disks one at each end of the drum. These brackets are pivotally mounted on shaft 21 so that they may be swung from a position below the drum 10 upwardly until the cone shaped disks face the end surfaces 11 and 12 of the drum after which they may be moved axially into contact with the end surfaces. Thereafter the bracket is tilted outwardly on the rail or shaft 21 to cause the edges of the cone shaped disks to pass between the end face of the drum and the turned in edges of the plies.

When the disks reach the bead their further progress is stopped and a second pair of disks is spaced from the end surface of the drum and passes outwardly turning the ply about the bead to encircle it so that the turned over end of the ply may be pressed against the outer surface of the plies beyond the bead ring.

In the embodiment shown in the accompanying drawings the disk carrying brackets are supported on a lever which comprises a pair of arms 22 and 23 pivotally mounted at one end on the shaft 21 and secured together by an integral rod or brace 24 so as to rotate as a unit. These arms may be bent or curved toward each other near their pivoted ends so as to fit against the standards 18 and 19 and thus be placed in fixed axial position to the drum 10.

Spanning the arms 22 and 23 in spaced parallel relation near the free ends thereof are a pair of longitudinally extending shafts 25 and 26.

The lever 22—23 may be swung upwardly about the shaft 21, on which it pivots, by means of a fluid operated piston and cylinder 27 pivotally supported at its lower end on a bracket 28 on the base and having a piston rod connected to a cross shaft 29 spanning the lever arms 22 and 23 at a short distance from the shaft 21. Fluid may be admitted to and exhausted from the cylinder 27 by means of a magnetically controlled valve 30, Fig. 1. When fluid is admitted to the lower end of the cylinder 27 it forces the piston upwardly and tilts the lever assembly upwardly from the position shown in full lines in Figs. 1 and 2 to that shown in broken lines.

Slidably mounted on the shafts 25 and 26 are a pair of triangular brackets 31 and 32. These brackets may be separated beyond the planes of the end surfaces of the drum 10 and are thus separated when in the lowermost position. Mounted on the apex of each of the brackets 31 and 32 respectively, are rotatably supported turnover disks 33 and 34, respectively, and a rock lever 35 or 36 respectively. Mounted on the free ends of the rock levers 35 and 36 respectively, are cone shaped disks 37 and 38 projecting toward each other and with their flat faces opposed. The rock arms 35 and 36 are each resiliently held in a lowered position against stops 39 by means of springs 40 tensioned between ears 41 on the ends of the triangular brackets 31 and 32 respectively, and on the rock arms 35 and 36.

Figure 2:
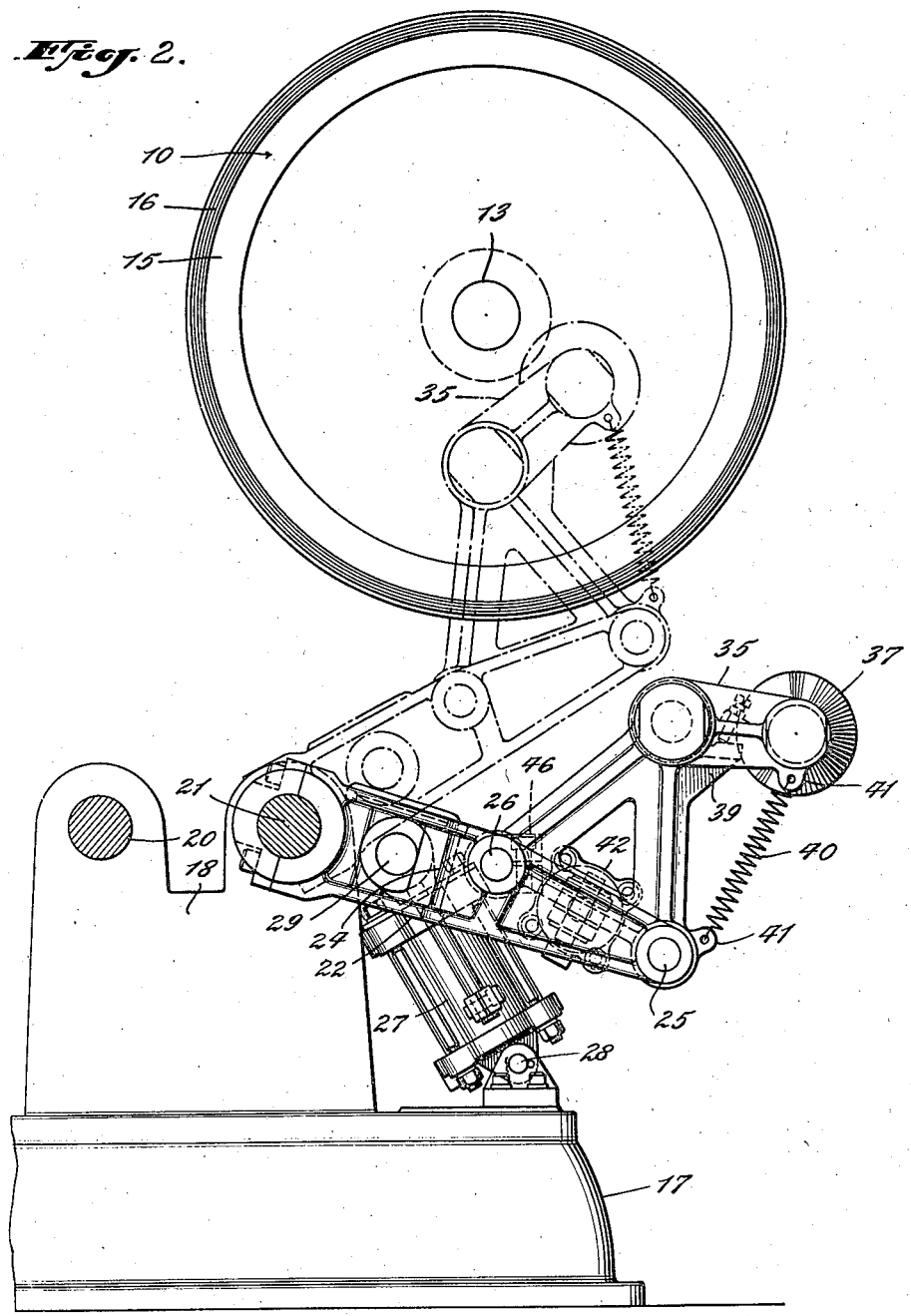
Fig. 2 is a side elevation of the mechanism shown in Fig. 1.

When these brackets are spaced apart as shown in Fig. 1 and the assembly of brackets and levers 22—23 is tilted upwardly to the position shown in broken lines in Fig. 2, the disks 33 and 37 will be spaced from one end face of the drum 10 and within the perimeter of the edge of the turnover ply and, similarly, the disks 34 and 38 will be spaced from the opposite end face of the drum and within the perimeter of the turnover plies and bead. In this position the brackets 31 and 32 with their respective disks are moved toward each other by means of a piston and cylinder 42 mounted on the bracket 32 between the shafts 25 and 26 being bolted to the bracket 32, for example, and having a piston rod 43 extending to, and secured to, the bracket 31 by means of a clevis or bifurcated end 44.

Upon admitting fluid through a suitable electromagnetically controlled valve 45 to the lefthand end of the cylinder 42, the piston and its rod 43 are shifted to the right sliding the bracket 31 until it reaches a stop 46 on the shaft 26 and the disks 33 and 37 are brought in line with the end surface of the drum 10, whereupon further admission of fluid causes the bracket 32 to move to the left until it reaches a stop 47 on the shaft 26 and its disks 34 and 38 are brought in line with the opposite end surface of the drum. The drum is then rotated while the bracket and supporting arm assembly swings downwardly.

Figure 3:
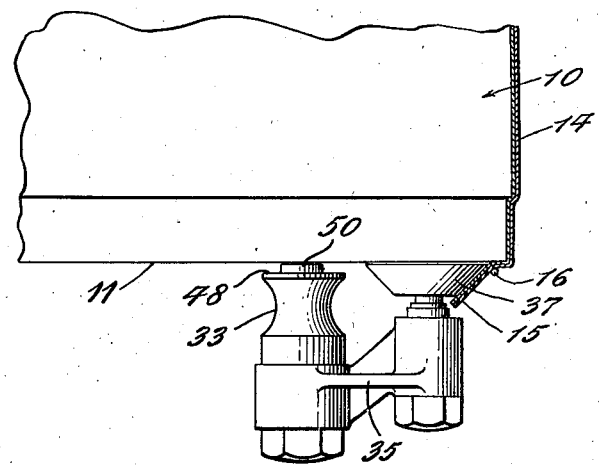
Fig. 3 is a detail radial section showing the beveled turning disk as it is brought against the tire bead.

As the disks 37 and 38 reach the inner edge of the turned over ply they rotate and the edge of the disk passes between the end surface of the drum and the plies forcing the plies outwardly along the conical surfaces of the disk, as shown in Fig. 3. As the disks move outwardly gradually and the plies are thus turned over progressively with the rapid rotation of the drum they do not displace the beads but rather anchor them the more securely by the outward turning of the margins of the plies.

Figure 4:
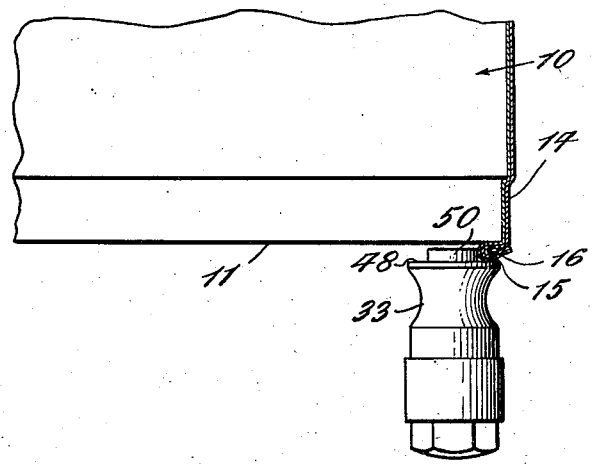
Fig. 4 illustrates the position of the turn over cylinder when it has reached the end of its movement to turn the fabric about the bead.

When the disks 37 and 38 are brought up against the inner circumferences of the beads and are stopped further lowering of the assembly causes the arms 35 to tilt stretching the spring 40 and causes the second turnover disks or rollers 33 and 34 to move outwardly over the bead and turned over ply as shown in Fig. 4.

These rollers or disks have flat surfaces 48 and 49, spaced from the ends of the drums by means of stubs 50 and 51 a distance equal to the combined thickness of the turned over plies and bead so that the turned over ply is thus pressed tightly about the bead as well as given a reverse turn. The remaining marginal end may then be readily pressed into contact with the outer surface of the plies between the beads. Thereafter the lever 22—23 is lifted to position, shown in dotted lines Fig. 2, fluid exhausted from the left end from the cylinder 42 and admitted to the right end thereof to separate the brackets 31 and 32 to the distances they occupy in Fig. 1, whereupon the fluid may be exhausted from the lower end of the cylinder 27 and the mechanism assume its original position. The final plies may then be applied overlapping the turned over-lower plies.

What I claim is:

1. A device for turning plies of tire fabric about a bead on the end face of a forming drum which comprises a disk beveled to an edge against said end face of said drum, a ply turning element having a face spaced from the plane of said beveled edge and means to support said disk in advance of said turning element and to permit it to yield backwardly toward the axis of said drum.

2. A device for turning plies of tire fabric about a bead on the end face of a forming drum which comprises a ply turning element having a face facing and spaced from the end face of said drum, a swinging arm pivoted to swing toward and away from the axis of said drum, a disk beveled to an edge against the end face of said drum and means to move said arm resiliently outwardly from the axis of said drum.

3. A device for turning plies of tire fabric about a bead on the end face of a forming drum which comprises a ply turning element having a face facing and spaced from the end face of said drum and having a stub projecting to said end face, a disk beveled to an edge against the end face of said drum and means to move said disk resiliently toward the periphery of said drum.

4. A device for turning plies of tire fabric about a bead on the end face of a forming drum which comprises a support pivoted on an axis parallel to that of said drum, a bracket on said support slidable axially thereof, a turnover element on said bracket having a stub projecting in a direction parallel to the axis of said support, a swinging arm on said bracket, a rotatable disk on said arm having a beveled edge in a plane at right angles to the axis of said support and a spring resiliently holding said arm and disk toward the peripheral edge of said drum.

5. Apparatus for turning plies of tire fabric about beads on opposite end faces of a forming drum which comprises a pair of arms pivoted on an axis parallel to the axis of said drum; a pair of rods connecting said arms and parallel to the axis of said drum; a pair of brackets slidably mounted on said rods; a pair of ply turning elements, one on each of said brackets, having a face facing the end face of said drum and a stub to space said face from the end face of said drum; a pair of swinging arms, one on each bracket; a pair of bevel edged disks, one on each swinging arm, the edge of said disk being in a plane parallel to the respective end faces of said drum; a spring to hold said arm outwardly from the axis of said drum; a cylinder mounted on one of said brackets and projecting toward the other, and a piston in said cylinder and extending to and connected with the opposite bracket.

6. A tire building apparatus comprising a rotating forming drum; a ply turnover device comprising a support pivoted to swing toward and from said drum, and having rods parallel to the axis of said drum; a pair of brackets slidably mounted on said rods, one near each end thereof, and having a turnover disk within the periphery of said drum and slightly spaced from the end thereof when said pivoted support is swung toward said drum; a swinging arm on each of said brackets, and an edged disk rotatably mounted on said arm in position to contact the ends of said drum; a spring between each said arm and bracket to yield as said support is moved away from said drum and means for swinging said support toward and from said drum and for sliding said brackets toward each other.

7. A ply turnover device for turning plies on the end of a forming drum over a bead which comprises a support pivoted to swing toward and from the forming drum and having rods parallel to the axis of pivoting; a pair of brackets slidable on said rods and spaced one near each end of said rods, each bracket having a swinging arm and a spring resiliently holding said arm to yield inwardly toward the axis of the forming drum; a frusto-conical disk mounted on each said swinging arm with its flat face parallel to the corresponding end of the forming drum and means to tilt said pivoted support on its axis and to slide said brackets toward and from each other.

8. A ply turnover device for turning plies on the end of a forming drum over a bead which comprises a support pivoted to swing toward and from the forming drum and having rods parallel to the axis of pivoting; a pair of brackets slidable on said rods and spaced one near each end of said rods, each bracket having a swinging arm and a spring resiliently holding said arm to yield inwardly toward the axis of the forming drum; a frusto-conical disk mounted on each said swinging arm with its flat face opposite the corresponding end of the forming drum and means to tilt said pivoted support on its axis and to slide said brackets toward and from each other, and a turnover disk mounted on each said bracket and having a stem projecting toward the end of the drum.

9. The apparatus of claim 8 having adjustable stops for said brackets to limit their movement toward each other.

10. In a tire building machine a forming drum and turnover elements to turn tire fabric about a bead ring on the end face of said drum which comprises a disk having a face spaced from the end face of said drum; a pivoted arm supporting said disk to move it toward the circumference of said drum; a second disk having a bevel edge positioned flat against the end face of said drum; a swinging arm for said second disk for resiliently and yieldingly holding said second disk nearer the edge of said drum than said spaced disk.

11. A fabric turnover device for tire forming drums which comprises a pair of brackets; means to support said brackets to slide longitudinally of said drum to and away from the opposite faces of said drum; a turnover disk mounted on each of said brackets in position to move across the end face of a drum and having a stem to space said disk from the end face of said forming drum when said stem contacts therewith; a swinging arm mounted on said bracket; a frusto-conical disk mounted on said swinging arm to contact with the adjacent face of said drum and a spring tensioned to hold said swinging arm resiliently outwardly in advance of said bracket when swinging outwardly toward the edge of said drum.

12. Apparatus for turning plies of fabric about beads on end faces of a forming drum which comprises a support pivoted on an axis parallel to that of said drum; a pair of brackets slidably mounted on said support to move toward and from the opposite end faces of said drum, each said bracket having a rotatable ply turning element mounted thereon, said ply turning element having a face facing and spaced from the end face of said drum and a stub projecting axially therefrom toward said end face; a swinging arm on said bracket; a disk having a face facing the end face of said drum and having an edge bevelled to said face; means to move said swinging arm resiliently away from the axis of said drum and means to move said brackets toward and from the opposite end faces of said drum.

13. Apparatus for turning plies of fabric about beads on end faces of a forming drum which comprises a support pivoted on an axis parallel to that of said drum; a pair of brackets slidably mounted on said support to move toward and from the opposite end faces of said drum, each said bracket having a rotatable ply turning element mounted thereon, said ply turning element having a face facing and spaced from the end face of said drum and a stub projecting axially therefrom toward said end face; a swinging arm on said bracket; a disk having a face parallel to the end face of said drum and having an edge bevelled to said face of said disk; means to move said swinging arm resiliently away from the axis of said drum; a pneumatically operated cylinder mounted on one of said brackets and a piston in said cylinder and connected to the opposite bracket.

14. A fabric turnover device for tire forming drums which comprises a support pivoted to tilt to and from a forming drum and having a pair of spaced supporting rods parallel to the axis of tilting; a pair of brackets slidable on said rods and extending upwardly therefrom; a pair of turnover disks one mounted on each of said brackets and facing the adjacent end of the forming drum and having a stem to space it from the end of said forming drum when said stem contacts therewith; a pair of swinging arms, one pivoted on each bracket, each of said swinging arms having a rotatable frusto-conical disk with the face in position to contact with the adjacent end of said drum, and a spring confined between said swinging arm and said bracket to urge said arm in a direction away from the axis of said drum.

CUYLER S. McCHESNEY.